US 8,848,231 B2

(12) United States Patent
Oyama

(10) Patent No.: US 8,848,231 B2
(45) Date of Patent: Sep. 30, 2014

(54) IMAGE FORMING APPARATUS, METHOD AND STORAGE MEDIUM FOR MATCHING FUNCTIONALITY OF CARD CAPABILITIES

(75) Inventor: Naoki Oyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/545,599

(22) Filed: Jul. 10, 2012

(65) Prior Publication Data

US 2013/0016398 A1    Jan. 17, 2013

(30) Foreign Application Priority Data

Jul. 15, 2011   (JP) ................. 2011-156230

(51) Int. Cl.
*G06K 15/00*   (2006.01)
*G06K 15/02*   (2006.01)
*G06F 3/12*    (2006.01)

(52) U.S. Cl.
CPC .............. *G06K 15/005* (2013.01); *G06F 3/128* (2013.01); *G06K 15/1886* (2013.01)
USPC .......................... 358/1.16; 358/1.15; 358/1.14

(58) Field of Classification Search
CPC ................ G06F 12/0246; G06F 12/02; G06F 2212/7202; G06F 2212/2022; G06F 2212/7208; G06F 2212/1016; G06F 2213/3854; G06F 3/0679; G06F 3/12; G06F 3/0614; G06F 13/385; G06F 13/0613

USPC ........................................ 358/1.16, 1.15, 1.14
See application file for complete search history.

(56) References Cited

U.S. PATENT DOCUMENTS

| | | | |
|---|---|---|---|
| 2004/0107327 A1* | 6/2004 | Takahashi et al. | 711/170 |
| 2006/0140658 A1* | 6/2006 | Shimizu | 399/77 |
| 2008/0225337 A1* | 9/2008 | Yano | 358/1.16 |
| 2009/0073492 A1* | 3/2009 | Okabe | 358/1.16 |
| 2011/0188083 A1* | 8/2011 | Takatsuka et al. | 358/1.16 |

FOREIGN PATENT DOCUMENTS

JP    2010-147970 A    7/2010

* cited by examiner

*Primary Examiner* — Jacky X Zheng
(74) *Attorney, Agent, or Firm* — Canon USA, Inc. IP Division

(57) ABSTRACT

The present invention relates to an image forming apparatus capable of attaching a storage medium, the image forming apparatus including an input unit configured to input information indicating data write speed into a storage medium attached to the image forming apparatus, a determination unit configured to determine whether the storage medium can be used in each function which the image forming apparatus has, based on information indicating the data write speed input by the input unit, and a presentation unit configured to present a determination result of the determination unit to a user.

13 Claims, 9 Drawing Sheets

FIG. 3

| SDHC 4GB | CLASS 4 | REQUEST CLASS | CAPACITY (GB) | NUMBER OF WRITING TIMES |
|---|---|---|---|---|
| PUT | ○ | CLASS 2 | 1 | 2 |
| MEAP | ○ | CLASS 4 | 0.3 | 15673 |
| FONT | ○ | CLASS 2 | 1.5 | 1 |
| SPOOL | △ | CLASS 6 | 1 | 421 |
| RECEIVE BUFFER | × | CLASS 8 | 0 | 0 |

311 — TOTAL 3.8
312 — SPACE 0.2

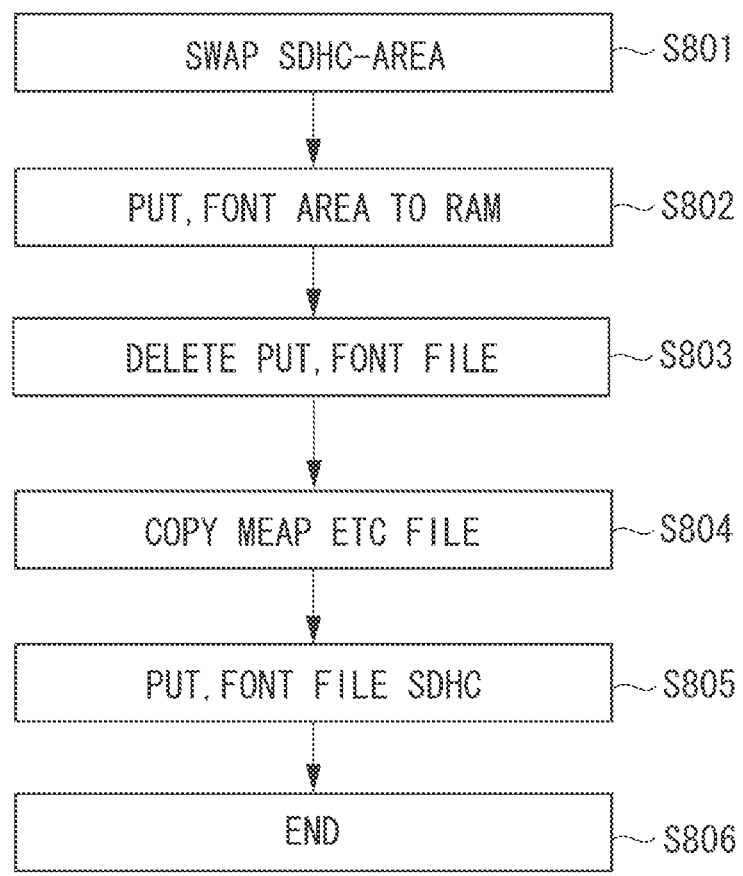

IMAGE FORMING APPARATUS, METHOD AND STORAGE MEDIUM FOR MATCHING FUNCTIONALITY OF CARD CAPABILITIES

BACKGROUND OF THE INVENTION

1. Field of the Invention

The present invention relates to an image forming apparatus, a control method for the image forming apparatus, and a storage medium.

2. Description of the Related Art

Conventionally, memory cards or universal serial bus (USB) memories have been used for personal computers or digital cameras. Further, in printing apparatuses, a model which is mounted with a hard disk conventionally exists. The memory cards have disadvantages such as smaller memory capacities, slower write speeds and limited lifetime as to a number of write operations (hereinafter, a number of writes) as compared with the hard disks. However, the memory cards offer also significant advantages with respect to an attaching method or availability, price, easiness to carry, resistance to vibration, thermal resistance, and therefore, they may be also used as a storage medium in place of a hard disk.

In recent memory cards, the mainstream has shifted from a compact flash memory to a secure digital (SD) card, and in digital cameras, the SD-card has become a main storage medium. Further, the SD-card may be used in some cases for the digital video cameras.

The SD-card has a limit of up to 2 GB storage capacity, and in a case of more than 2 GB capacity, a secure digital high capacity (SDHC) card will be used. The SD-card, SDHC-card, the USB memory, and compact flash memory all include flash memory which has become a main storage medium, and uses NAND flash memory which is suitable mainly for large capacity.

However, while flash memory has fast read speed, it has a drawback of slow write speed. To compensate for slow write speed of single piece of the flash memory, parallel processing or buffering is performed by a flash memory controller mounted on respective cards.

Also in image forming apparatuses, there is a model which is detachably equipped with a memory card, especially an SD-card, in place of the hard disk. The hard disk is at a disadvantage with respect to component volume, attachability, and price.

The SDHC-card when used in the image forming apparatus has various use applications, which include, for example, an automatic program updating tool, a reception buffer, and data storage of page description language (PDL) system (BOX function). The capability of an SD-card varies depending on functions such as a function which uses write speed, a function which uses read speed, and a function which uses only memory capacity. (Japanese Patent Application Laid-Open No. 2010-147970).

However, in an SDHC-card, while the read speed does not vary significantly depending on the quality of the SDHC-card, the write speed varies significantly depending on the quality of the SDHC-card. Generally, if the SDHC-card has the same memory capacity, the more inexpensive the SDHC-card, the slower the write speed, and the more expensive the SDHC-card, the quicker the write speed.

Therefore, in a case where an inexpensive SDHC-card is attached to the image forming apparatus, the write speeds of the SDHC-card used by the functions of the image forming apparatus cannot be met. In such a case, when the image forming apparatus operates using the attached SDHC-card, there is a possibility that, for example, a problem such as an overrun (defective image) occurs during a printing process.

Therefore, among the functions of the image forming apparatus, there is a function which can use the SDHC-card with no problem, and a function which cannot use the SDHC-card with no problem, depending on the write speed of the SDHC-card. However, the user may not know a function as to which the SDHC-card meets the write speed, or a function which does not meet the write speed, or may not know what function uses what degree of the write speed. Consequently, an expensive SDHC-card with fast write speed has typically been attached to image forming apparatuses.

SUMMARY OF THE INVENTION

The present invention provides a mechanism for enabling the use of the functions of an image forming apparatus matching the write speed of the SDHC-card attached to the image forming apparatus, as well as for presenting to the user the functions of the image forming apparatus in which the SDHC-card cannot be used.

According to an aspect of the present invention, in an image processing apparatus capable of attaching a storage medium, the image forming apparatus includes an input unit configured to input information indicating data write speed into a storage medium attached to the image forming apparatus; a determination unit configured to determine whether the storage medium can be used in each function which the image forming apparatus has, based on information indicating the data write speed input by the input unit; and a presentation unit configured to present a determination result of the determination unit to a user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a function write speed determination screen which is one of remote user interface (RUI) screens displayed on a display unit of the PC.

FIG. 9 is a flowchart illustrating an example of SDHC storage area replacement processing (SWAP SDHC-area processing) in the image forming apparatus according to the present invention.

DESCRIPTION OF THE EMBODIMENTS

Various exemplary embodiments, features, and aspects of the invention will be described in detail below with reference to the drawings.

Figure 1:
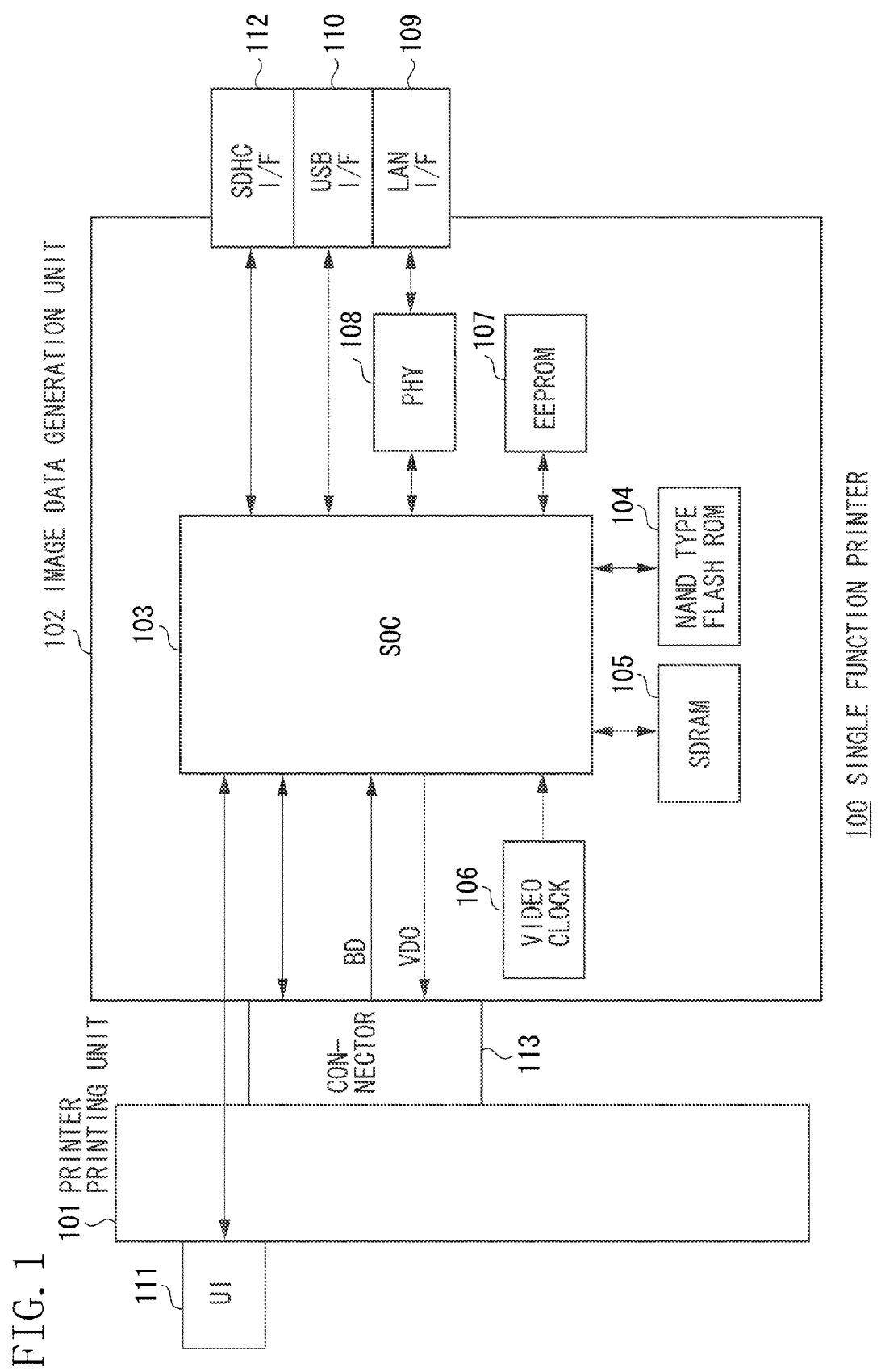
FIG. 1 is a block diagram illustrating an example of a configuration of an image forming apparatus according to one exemplary embodiment of the present invention.

FIG. 1 is a block diagram illustrating an example of a configuration of the image forming apparatus according to the first exemplary embodiment of the present invention. In FIG. 1, a single function printer 100 is illustrated. In the present exemplary embodiment, as the image forming apparatus according to the present invention, relatively simple Single Function Printer (hereinafter, SFP) is illustrated as an example. However, a multifunction peripheral, for example, Multi Function Printer, (hereinafter, MFP) may be used.

A printing unit 101 is an entire printing portion of the SFP 100. An image data generation unit 102 is a section where print request data sent from an external apparatus, such as a personal computer (PC), is specifically converted into image data and is converted into data compliant with a printer printing unit 101. The image data generation unit 102 is generally called a printer controller.

A System On Chip (SOC) 103 is an integrated circuit with a built in central processing unit (CPU). The SOC 103 performs as a single piece of chip, all of communication and image data transfer with a CPU, a memory control unit (not illustrated), and the printer printing unit 101. The SOC 103 also performs control of external interfaces such as USB and local area network (LAN), and SDHC for accepting the print request data from a personal computer (PC).

A NAND flash ROM 104 stores a program code or data for operating the CPU built into the SOC 103. A synchronous dynamic random access memory (SDRAM) (or double data rate (DDR) SDRAM) 105 is a memory used to expand the program code stored in the NAND flash ROM 104, or to store picture image data, or to store temporary data for program.

A video clock 106 is used to transfer image data from the SOC 103 to the printer printing unit 101. An electrically erasable programmable ROM (EEFROM) 107 is a nonvolatile memory capable of holding information necessary for the printing apparatus even when power is not supplied to the SFP 100.

A physical layer (PHY) 108 is a driver receiver integrated circuit (IC) for data communication of a network (LAN). A network (LAN) interface (I/F) 109 has a connector or the like for connecting a LAN cable. A USB device interface (USB I/F) 110 is used to connect a USB device.

An SDHC interface (SDHC I/F) 112 can be used in common for the SD-card and the SDHC-card, and is used to insert the SD-card or the SDHC-card. In other words, the SFP 100 is an image forming apparatus which can attach the SD-card thereto.

A user interface (UI) (also referred to as an operation panel) 111 has a display unit and an operation unit (not illustrated) (a touch panel type display unit integrating the display unit and the operation unit may also be used). The UI 111 displays a notification to a user, and is used for the user to operate the SFP 100, or to make various settings suited to usage of the SFP 100. A connector 113 is used to connect the printer printing unit 101 and the image data generation unit 102.

The SFP 100 has a function referred to as an RUI (remote UI) for displaying status of the SFP 100 on the PC that can communicate via a network such as LAN, or for enabling setting or operation of the SFP 100 from the PC.

Figure 2:
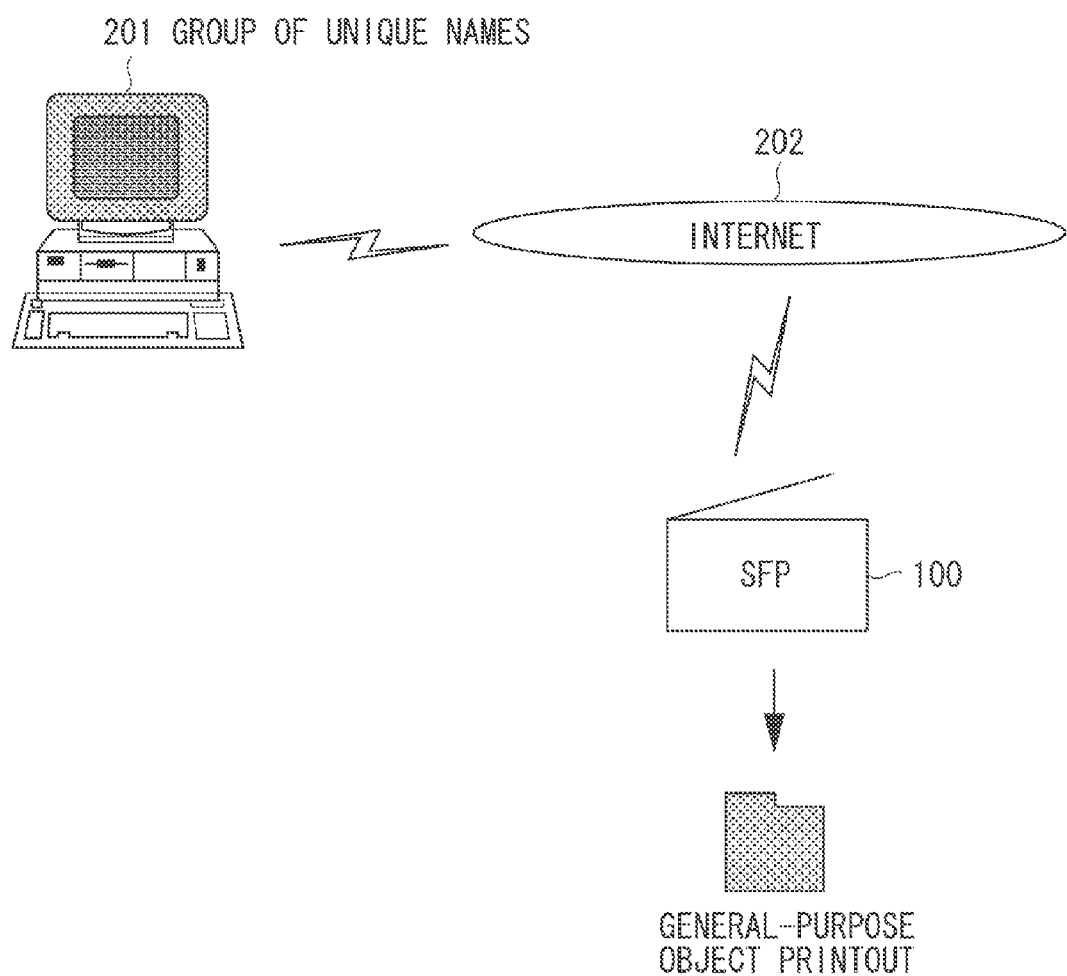
FIG. 2 is a conceptual view illustrating an example of an image forming system which connects a single function printer (SFP) and a personal computer (PC) via a network.

FIG. 2 is a conceptual view illustrating an example of an image forming system in which the SFP 100 and the PC are connected via the network. As illustrated in FIG. 2, in the image formation system according to the present exemplary embodiment, a PC 201 and an SFP 100 are connected so that they can communicate each other via a network (although an Internet network 202 is used in this case, but the LAN maybe used). The PC 201 communicates with the SFP 100 via the Internet network 202, and can display an RUI screen (e.g., FIG. 3, or FIG. 4) of the SFP 100 on a display unit of the PC 201.

Among various functions which the SFP 100 has, there are some functions that can be operated using the SDHC-card inserted into the SDHC I/F 112. For example, the functions include an automatic program update tool (hereinafter, PUT), a multifunctional embedded application platform (MEAP), a FONT, a simultaneous peripheral operation on-line (SPOOL), and a RECEIVE BUFFER. Hereinbelow, respective functions will be described.

The PUT (automatic program update tool) is a function for allowing the latest program to be distributed via a server, and automatically updating the programs of the SFP 100. Since the PUT is not a function to be used in routine works, the very memory capacity is not necessary, and is considered to be free of the influence of the write speed into a memory.

The MEAP is a program for the user to create an application necessary for user's work on the SFP 100, using JAVA (registered trademark) application on the SFP 100. Data necessary for the application is stored in a file system format. Though different depending on the MEAP application, generally in the MEAP, the contents to be handled as a file is small, and the write speed into a memory is not considered to have much influence on the MEAP.

The FONT is used as characters when fonts (characters) necessary during printing are downloaded from a server or the like, and the characters are printed. In the FONT, since the write speed into the memory is used only at the time of downloading, the write speed into the memory is not considered to have much influence on the FONT, during printing.

The SPOOL is used to load PDL data onto a memory. In a case where a capacity of the SDRAM 105 of the image data generation unit 102 is insufficient when loading the PDL data, the SPOOL is used to load (image reloading) the data using a free space on the SDHC-card. In other words, the SPOOL uses the free area on the SDHC-card as an area for performing image reloading when image reloading is to be performed. Since the SPOOL is a function to be used during printing, the write speed into the memory is relatively important. However, cases where the reloading on the SDHC-card is necessary do not often occur. More specifically, since the data subject to the image reloading is considered to be small in amount, the write speed into the SDHC-card is not considered to have much influence on the SPOOL process.

The Receive Buffer is a buffer that receives data in a page description language (PDL) format during printing. For this reason, in a case where the SDHC-card is allocated to the receive buffer, the Receive Buffer writes the received data into the SDHC-card every time printing is performed. As a result, an operation of the Receive Buffer completely relies on the write speed into the SDHC-card. Therefore, the write speed into the SDHC-card is not considered to have much influence on the Receive Buffer.

Thus, functions used in the same SFP 100 are various. One function uses more than a certain speed for data write (hereinafter, write speed) into the SDHC-card. Another function uses more than a certain capacity, as a capacity of the SDHC-card. In the SD-cards, although notations of the write speeds are random and arbitrary, in the SDHC-card, notations of the speed classes indicating the write speeds are essential. Hereinbelow, the speed classes are illustrated by way of example.
CLASS 2: 2 MB/sec (16 Mbps)
CLASS 4: 4 MB/sec (32 Mbps)
CLASS 6: 6 MB/sec (48 Mbps)
CLASS 10: 10 MB/sec (80 Mbps)

The SFP 100 according to the present exemplary embodiment determines whether the respective functions can be used, based on the speed classes of the SDHC-cards which the above-described functions of the SFP 100 use, influence of the write speeds of data on the respective functions, and the speed class (information indicating write speed) of the SDHC-card inserted into the SDHC I/F 12, and the determination result is presented to the user.

FIG. 3 illustrates an example of a screen for determining a function write speed which is one of the RUI screens displayed on the display unit in the PC 201. In FIG. 3, a screen 300 for determining the function write speed presents to the user a determination result about whether a function can be used, based on characteristics of the SFP functions and the SDHC write speeds.

In a row 306, names read out from the SDHC-card currently being attached, or names of respective functions 301 through 305 are displayed. In a row 307, information indicating the speed class of the SDHC-card currently being attached, and information indicating whether the respective functions 301 through 305 can be used in the speed class of the SDHC-card currently being attached (a determination result of whether usable or not) are displayed. "○" indicates that the SDHC-card is compliant with the function. Further, "×" indicates that the SDHC-card is not compliant with the function and an area on the SDHC-card is not allocated. Furthermore, "Δ" indicates that the SDHC-card is not compliant with the function but an area on the SDHC-card is allocated.

For example, the speed class used by a Receive Buffer 305 is "CLASS 8" and the speed class of the SDHC-card currently being attached is "CLASS 4". Accordingly, "×" is displayed as an error message indicating that the SDHC-card currently being attached does not meet the need, and is not compliant with the Receive Buffer 305. In this case, the Receive Buffer cannot use the SDHC-card as the receive buffer, and will use a memory (e.g., the SDRAM 105) other than the SDHC-card.

Further, the speed class used by a SPOOL 304 is "CLASS 6" and the speed class of the SDHC-card currently being attached is "CLASS 4". Consequently, the SDHC-card currently being attached does not meet the need, and is not compliant with the SPOOL 304. However, as described above, in the SPOOL 304, the write speed into the SDHC-card is not considered to have much influence although the SDHC-card is not compliant with the SPOOL 304. Accordingly, "Δ" is displayed as a warning message indicating that an area on the SDHC-card is allocated. In this case, the SPOOL can use the SDHC-card, but there is a possibility that overrun or the like may occur during printing.

Caution such as an error message or a warning message may also be put in writing instead of "×" or "Δ". For example, messages may be displayed on the RUI including "Since speed class of SDHC-card is low, SDHC-card is not compliant with the Receive Buffer function, and an area on the SDHC-card is not allocated. Speed class used by the Receive Buffer function is CLASS 8 or higher", "Since speed class of SDHC-card is low, the SDHC-card is not compliant with the SPOOL function, but an area on the SDHC-card is allocated. Speed class used by SPOOL function is CLASS 6 or higher", or the like.

In a row 308, information indicating the speed classes of the SDHC-card which the respective functions 301 through 305 use is displayed. In a row 309, the capacities of the SDHC-card assigned to the respective functions 301 through 305 are displayed. The Receive Buffer 305 is not compliant with the SDHC-card with "CLASS 4" currently being attached (due to "×" in the row 307), and accordingly a capacity is not assigned, and "0" is displayed.

A total of the capacities of the SDHC-card assigned to the respective functions is displayed in a total 311. A space 312 of the SDHC-card which is not assigned is displayed.

In a row 310, current numbers of writes into the SDHC-card currently being attached are displayed with respect to the functions 301 through 305. In a case where a number of writes into the SDHC-card of any function exceeds a write limit of the SDHC-card, the SFP 100 may display a warning message to that effect on the RUI. Thus, the SFP 100 records a number of writes for each function and a time length elapsed after writing is carried out, for each SDHC-card, on the EEPROM 107 or the like, and manages a lifetime as to the writes into the SDHC-card.

Figure 4:
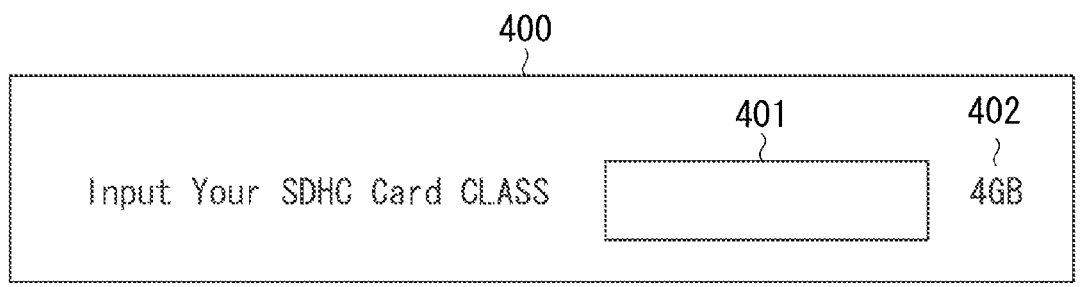
FIG. 4 is illustrates an example of an SDHC-card class input screen which is one of the RUI screens displayed on the display unit of the PC.

FIG. 4 illustrates an example of SDHC-card class input screen as one of the RUI screens displayed on the display unit in the PC 201. In FIG. 4, an SDHC-card class input screen 400 is a screen for requesting the user to input a speed class of the SDHC-card. The SDHC-card class input screen 400 is first displayed on the RUI or the UI 111 by the SOC 103 in the SFP 100 when the SDHC-card is inserted into the SDHC I/F 112 in the SFP 100.

The user needs to input the speed class of the SDHC-card inserted into the SDHC I/F 112 from an input portion 401 in the SDHC-card class input screen 400. A capacity 402 displayed on the SDHC-card class input screen 400 is automatically calculated and displayed by the SOC 103 in the SFP 100 which has acquired information from the SDHC-card inserted into the SDHC I/F 112.

Figure 5:
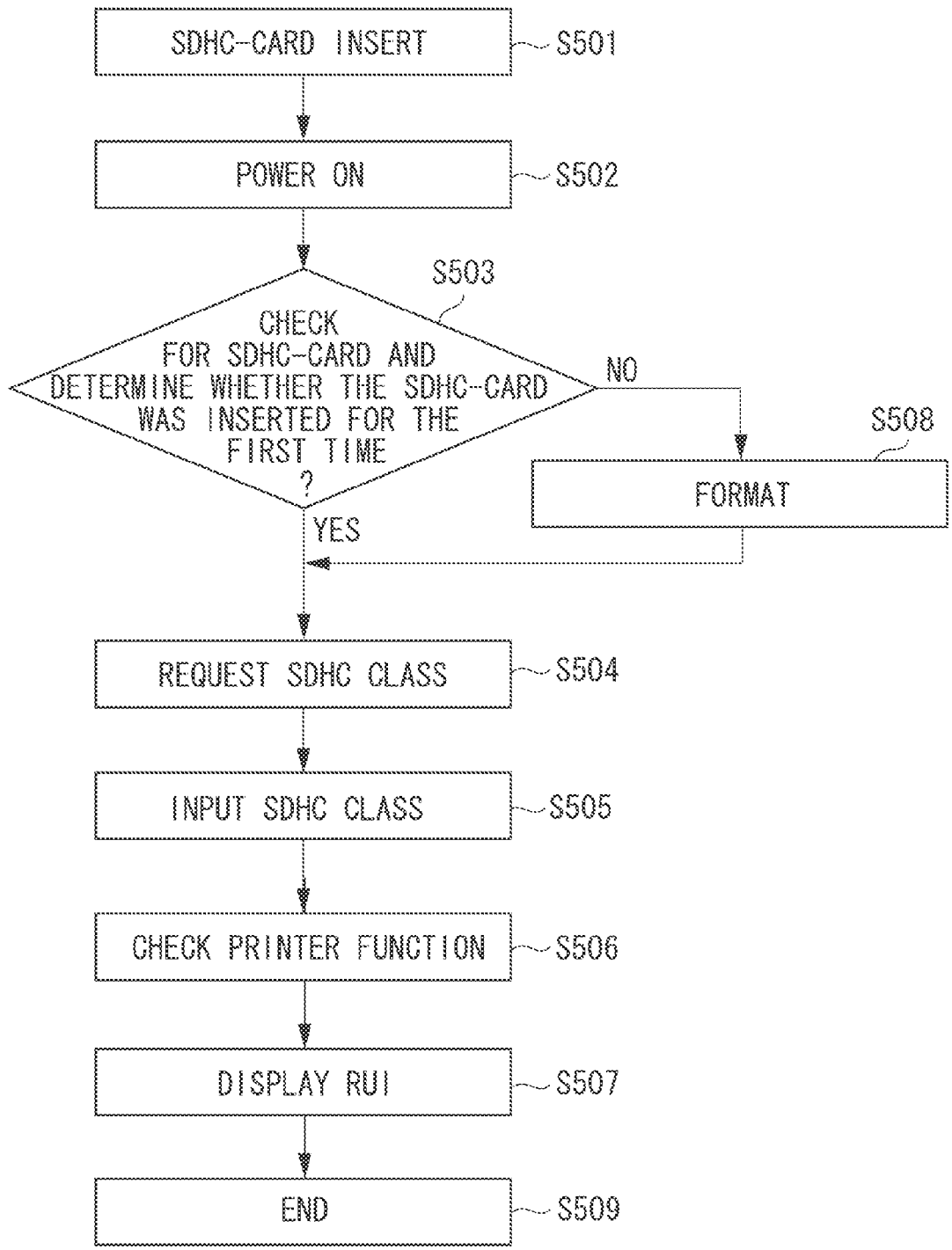
FIG. 5 is a flowchart illustrating an example of SDHC-card check processing in the image forming apparatus according to the first exemplary embodiment of the present invention.

Hereinbelow, referring to FIG. 5, the SDHC-card check processing according to the first exemplary embodiment will be described. FIG. 5 is a flowchart illustrating an example of the SDHC-card check processing in the image forming apparatus according to the first exemplary embodiment of the present invention. Steps S503 through S509 in this flowchart are realized by causing the CPU in the SOC 103 to read and execute a program computer-readably recorded on the NAND flash ROM 104.

First, in step S501, the user inserts the SDHC-card into the SDHC I/F 112. In step S502, when turning on power source of the SFP 100, the SFP 100 is started up, and the CPU in the SOC 103 starts the processing in step S503 and beyond.

In step S503, the CPU in the SOC 103 checks the SDHC-card inserted into the SDHC I/F 112, and determines whether this SDHC-card is the one inserted for the first time. If the SDHC-card has not been formatted, it is determined that this is the one inserted for the first time. On the other hand, if the SDHC-card has been formatted, it is determined that this is not the one inserted for the first time.

Then, if it is determined that the SDHC-card is not the one inserted for the first time (NO in step S503), the CPU in the SOC 103 advances the processing to step S508. In step S508, the CPU in the SOC 103 formats the SDHC-card inserted into the SDHC I/F 112, then advances the processing to step S504. On the other hand, if it is determined that the SDHC-card is the one inserted for the first time (YES in step S503), the CPU in the SOC 103 advances the processing to step S504.

In step S504, the CPU in the SOC 103 displays the screen illustrated in FIG. 4 on the RUI or the UI 111, and requests the user to input a speed class of the SDHC-card.

Next, in step S505, the CPU in the SOC 103 accepts input of the speed class of the SDHC-card from the input portion 401 in FIG. 4, and advances the processing to step S506. In step S506, the CPU of the SOC 103 compares the speed classes of the SDHC-card input in the above-described step S505 with the speed classes used by the respective functions (e.g., PUT, MEAP, FONT, SPOOL, RECEIVE BUFFER, etc.) which the SFP 100 has.

Next, in step S507, the CPU in the SOC 103 displays the screen 300 for determining function write speed as illustrated in FIG. 3 on the RUI or the UI 111, based on a comparison result in the above step S506. Then, in step S509, the processing in the flowchart ends.

As described above, according to the first exemplary embodiment of the present invention, by inputting a speed grade of the SDHC when the user attaches and uses the SDHC-card in the image forming apparatus, the user is allowed to use the function of the image forming apparatus which matches a capability of the SDHC-card, and a warning can be presented to the user relating to a function in which the SDHC-card cannot be used. Further, a function in which the SDHC-card can be effectively used is presented to the user.

Further, the image forming apparatus can be operated to prevent occurrence of problems due to the write speed of the SDHC-card by allocating a storage area of the SDHC-card only to a function using the write speed which the SDHC-card satisfies.

Hereinbelow, a second exemplary embodiment will be described. In the first exemplary embodiment described above, the speed class of the SDHC-card input from the user is compared with the speed classes used by the respective functions which the SFP 100 has, and the function write speed determination screen (FIG. 3) is displayed on the RUI.

However, even when the CLASS notation is the same, the write speed may differ greatly depending on the SDHC-card. For example, even with respect to the same CLASS 2, an SDHC-card close to 2 MB/S, and an SDHC-card close to 4 MB/S may exist. Hence, even when the SDHC-card is CLASS 2, if, for example, the SDHC-card close to 4 MB/S is adopted, it may satisfy the write speed used by the MEAP function.

Figure 6:
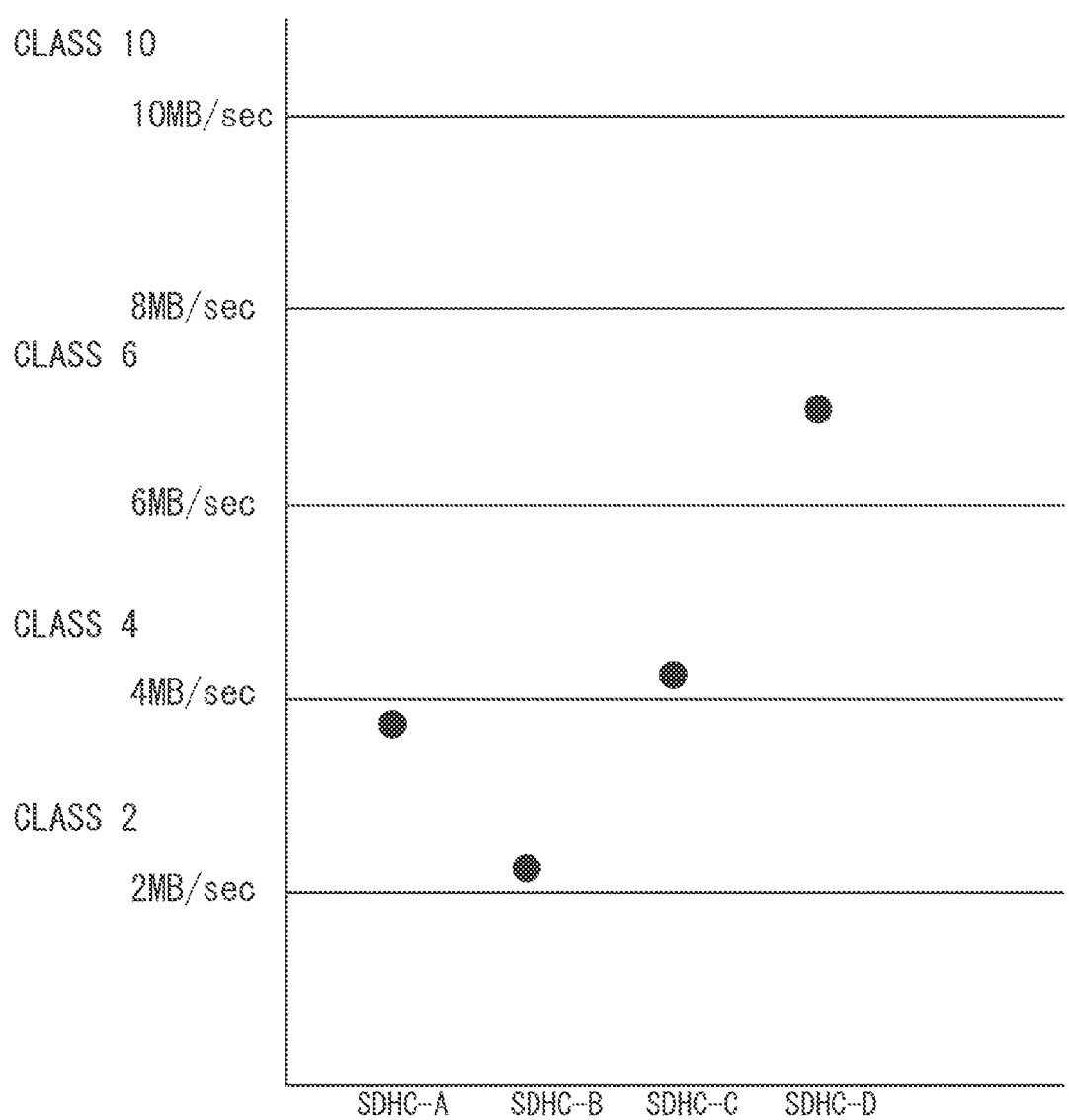
FIG. 6 illustrates an example of a distribution of measured write speeds and classes of the SDHC-cards.

FIG. 6 is a diagram illustrating an example of measured write speeds and a distribution of the classes of the SDHC-cards. As illustrated in FIG. 6, the SDHC-A is writeable at a speed infinitely close to 4 MB/Sec, and the SDHC-B close to 2 MB/Sec. Further, though the SDHC-C is CLASS 4, the write is performed at a speed close to 4 MB/Sec.

Considering such a case, in the present exemplary embodiment, when the SDHC-card is attached, and for example, the class is rather low, a speed of writing a specific file is measured. For example, even when the user attaches the SDHC card of CLASS 2, and inputs CLASS 2, if it is found by measurement that the SDHC-card has the ability close to CLASS 4, use of the SDHC-card in the function which uses CLASS 4 is allowed.

Figure 7:
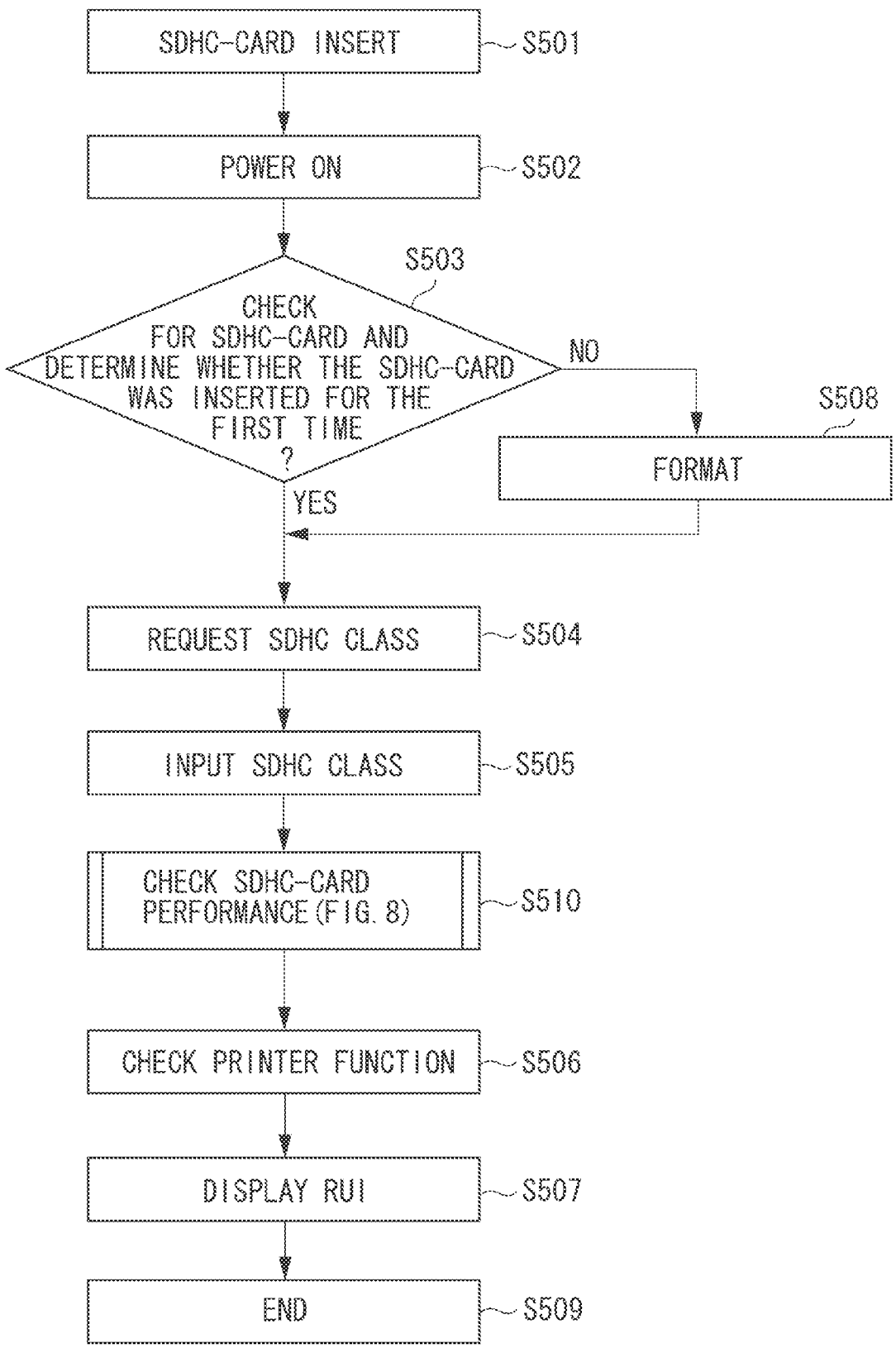
FIG. 7 is a flowchart illustrating an example of the SDHC-card check processing in the image forming apparatus according to a second exemplary embodiment of the present invention.

Hereinbelow, referring to FIG. 7 and FIG. 8, the SDHC-card check processing according to the second exemplary embodiment will be described. FIG. 7 is a flowchart illustrating an example of the SDHC-card check processing in the image forming apparatus according to the second exemplary embodiment of the present invention. Steps S503 through S510 in this flowchart are realized by causing the CPU in the SOC 103 to read and execute a program computer-readably recorded on the NAND flash ROM 104.

Steps S501 through S505 in FIG. 7 are identical processing to steps S501 through S505 in FIG. 5 and thus descriptions thereof will not be repeated. In step S510, the CPU in the SOC 103 executes SDHC-card performance diagnosis processing (check SDHC-card performance processing) illustrated in FIG. 8. In a case where the speed class of the SDHC-card input in the above step S505 is a predetermined class or higher (e.g., CLASS 4 or higher) the CPU in the SOC 103 may skip step S510 and advances the processing to step S506.

Next, in step S506, the CPU in the SOC 103 compares the speed class of the SDHC-card input in the above step S505, with the speed classes used by the respective functions (e.g., PUT, MEAP, FONT, SPOOL, RECEIVE BUFFER, etc.) which the SFP 100 has. Then, if a function in which the SDHC-card cannot be used exists, the CPU in the SOC 103 compares the speed class of the SDHC-card subjected to measurement diagnosis in the above step S510, with the speed classes used by the respective functions. Steps S507 through S509 in FIG. 7 are identical processing to steps S507 through S509 in FIG. 5 and thus descriptions thereof will not be repeated.

Hereinbelow, referring to FIG. 8, the SDHC-card performance diagnosis processing (check SDHC-card performance processing) will be described. FIG. 8 is a flowchart illustrating an example of the SDHC-card performance diagnosis processing (check SDHC-card performance processing) in the image forming apparatus according to the second exemplary embodiment of the present invention. The processing in this flowchart is realized by causing the CPU of the SOC 103 to read and execute a program computer-readably recorded on the NAND flash ROM 104.

In step S701, the CPU in the SOC 103 starts the SDHC-card performance diagnosis processing, and advances the processing to step S702. In step S702, the CPU in the SOC 103 starts a clock, and in step S703, writes the specific file into the SDHC-card, and after the write ends, in step S704, stops the clock.

Next, in step S705, the CPU in the SOC 103 calculates performance (measured speed) of the SDHC-card, in step S706, determines a speed class corresponding to the performance of the SDHC-card from the calculation result, and returns the processing to the flowchart in FIG. 7.

As illustrated above, according to the second exemplary embodiment of the present invention, the functions can be used which the measured capability of the SDHC-card matches, and a warning relating to the functions in which the SDHC-card cannot be used can be presented to the user. Further, the functions in which the SDHC-card can be used can be also presented to the user.

Figure 8:
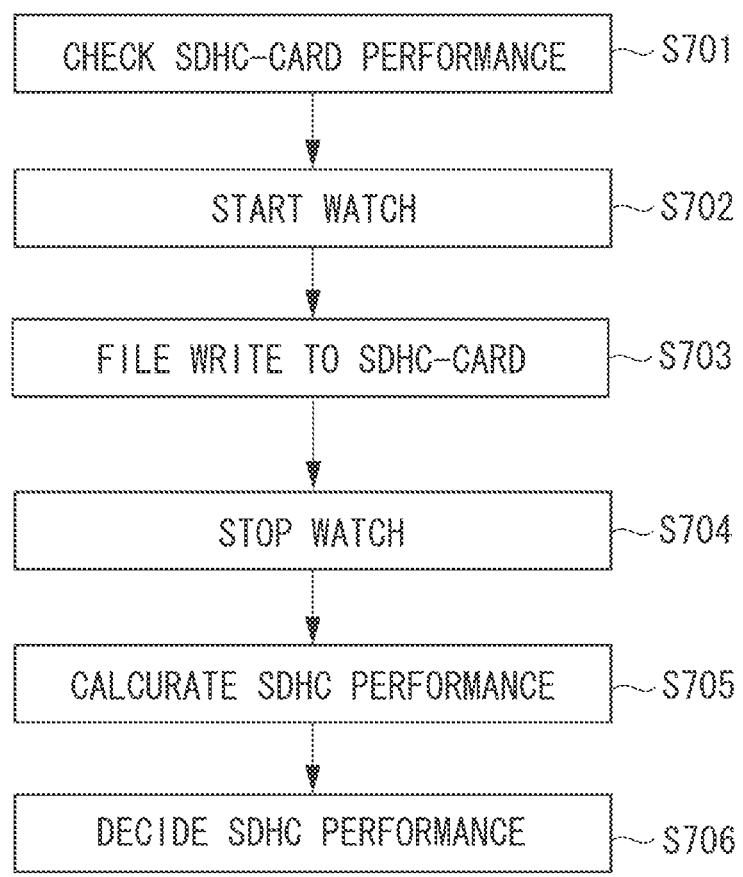
FIG. 8 is a flowchart illustrating an example of SDHC-card performance diagnosis processing (check SDHC-card Performance processing) according to the second exemplary embodiment of the present invention.

In place of requesting input of the speed class of the SDHC-card in the above step S504, it may be configured to execute the SDHC-card performance diagnosis processing illustrated in FIG. 8. In that case, the CPU in the SOC 103 compares the SDHC-card speed subjected to measurement diagnosis through the above-described SDHC-card performance diagnosis (measurement), with the speeds used by the respective functions which the SFP 100 has, and displays the screen as illustrated in FIG. 3.

In the image forming apparatus according to a third exemplary embodiment of the present invention, lifetime management of the SDHC-card is performed. Hereinbelow, the third exemplary embodiment will be described in detail. It is a well-known fact that extension of lifetime is basically performed by equalization of the numbers of writes (referred to as wear-leveling) inside the SDHC-card. However, as shown in the example in FIG. 3, in a case where the SDHC-card is used in the image formation apparatus, a number of writes varies depending on the functions. In the PUT or FONT, once a file is written, the file is scarcely erased and is not updated.

The SFP 100, apart from the wear-leveling inside the SDHC-card described above, performs processing for replacing a storage location (elements) (swap SDHC-area processing illustrated in FIG. 8) inside the SDHC-card of the file of the function using a large number of writes, with a storage location inside the SDHC-card of the file of the function using only a small number of writes.

FIG. 9 is a flowchart illustrating an example of the SDHC storage area replacement processing (swap SDHC-area processing) in the image forming apparatus according to the present invention. The processing in this flowchart is realized by causing the CPU in the SOC 103 to read and execute a program computer-readably recorded on the NAND flash ROM 104.

The CPU in the SOC 103 is configured to execute the SDHC storage area replacement processing (swap SDHC-area processing), each time a given time has elapsed, or a number of writes of a specific file has reached (exceeded) a given amount (a given number of times), for example.

In step S801, the CPU in the SOC 103 starts the swap SDHC-area processing. Then, in step S802, the CPU temporarily copies (saves) on the SDRAM 105 a file of a specific function using a small number of writes like the PUT or FONT on the SDHC-card.

Next, in step S803, the CPU in the SOC 103 deletes the PUT or FONT file on the SDHC-card. Next, in step S804, the CPU in the SOC 103 shifts the file of the function using a large number of writes (which has reached a given number of times) like the MEAP on the SDHC-card, to a storage area constituted by elements which store the file of the specific function using a small number of writes like the above-described PUT or FONT, on the SDHC-card.

Next, in step S805, the CPU in the SOC 103 writes again the file of the PUT or FONT saved in the above step S802, into a storage area constituted by elements which has stored the file of the function (e.g., MEAP) in which a number of writes has reached a given number of times, in the SDHC-card. Then, the processing in the flowchart ends.

In other words, the CPU in the SOC 103 performs control to replace an area inside the SDHC-card used by the function in which a number of data writes into the SDHC-card has reached a given number of times, with an area inside the SDHC-card used by the specific function using a small number of writes.

As described above, according to the third exemplary embodiment of the present invention, in addition to the effects of the first and second exemplary embodiments, the image forming apparatus also can prolong the lifetime of the SDHC-card.

In the exemplary embodiments described above, the screen illustrated in FIG. 4 is displayed on the RUI or the UI 111, and the user is requested to input a speed class of the SDHC-card. However, when a speed class of the SDHC-card can be acquired from the SDHC-card, the speed class may be acquired from the SDHC-card.

Further, in the exemplary embodiments above-described, although descriptions have been given taking the SDHC-card as an example, a configuration using other storage media (e.g., USB memory) in place of the SDHC-card is included in the present invention. In this case, the screen as illustrated in FIG. 4 is displayed on the RUI or the UI 111 to request the user to input information indicating the write speed of the storage medium, or information indicating the write speed is acquired from the storage medium.

As described above, in the image forming apparatus according to the present invention, the functions of the image forming apparatus can be used in conformity with the capability of the storage medium attached to the image forming apparatus, and a warning can be presented to the user, relating to the function in which the storage medium cannot be used. The functions in which the storage medium can be used can be also presented to the user. Through these presentations, it becomes possible for the user to accurately know the status of improved performance of the functions of the image forming apparatus by attaching the storage medium to the image forming apparatus. For example, it becomes also possible for the user to know the functions from which improved performance can be expected when attaching the storage medium to the image forming apparatus, and the functions from which improved performance cannot be expected.

The structures of various types of data and the contents thereof described above are not limited thereto. The data can be configured in various structures and contents depending to applications or purposes.

So far, one form of the exemplary embodiment has been described, but the present invention can be configured, for example, as a system, an apparatus, a method, a program or a storage medium. More specifically, the present invention may be applied to a system constituted by a plurality of devices, or to an apparatus constituted by a single device. Furthermore, all configurations combining the above-described exemplary embodiments are included in the present invention.

OTHER EMBODIMENTS

Aspects of the present invention can also be realized by a computer of a system or apparatus (or devices such as a CPU, a micro processing unit (MPU), and/or the like) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., a non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-156230 filed Jul. 15, 2011, which is hereby incorporated by reference herein in its entirety.

What is claimed is:

1. An image forming apparatus capable of attaching a storage medium, the image forming apparatus comprising:
    an input unit configured to input write speed information of a storage medium attached to the image forming apparatus; and
    a determination unit configured to determine whether the storage medium can be used in each function which the image forming apparatus has, based on the write speed information input by the input unit, wherein functionality of the image forming apparatus is matched with write speed capability of the storage medium, wherein the storage medium is a secure digital high capacity card (SDHC-card), and wherein write speed of the storage medium is a speed class of the SDHC-card.

2. The image forming apparatus according to claim 1, further comprising:

a measurement unit configured to write data into the storage medium and to measure write speed of the storage medium, wherein if the determination unit determines that the storage medium cannot be used in any function, based on the write speed information input by the input unit, it is determined whether the storage medium can be used in each of the functions, based on the write speed measured by the measurement unit.

3. The image forming apparatus according to claim 1, wherein the determination unit compares write speed of the storage medium with write speed used by each of the functions, and determines whether the storage medium can be used in each of the functions.

4. The image forming apparatus according to claim 1, further comprising:

a presentation unit configured to present a determination result of the determination unit to a user, wherein if it is determined by the determination unit that a function exists in which the storage medium cannot be used, the presentation unit presents information of a function in which the storage medium cannot be used, to a user.

5. The image forming apparatus according to claim 1, further comprising:

a presentation unit configured to present a determination result of the determination unit to a user; and a storage unit configured to store for each of the functions, a number of data writes indicating a number of times data has been written into the storage medium according to the functions, wherein the presentation unit presents a number of data writes for each of the functions stored in the storage unit, to a user.

6. The image forming apparatus according to claim 5, wherein if a number of data writes of any function exceeds a write limit of the storage medium, the presentation unit notifies a user accordingly.

7. The image forming apparatus according to claim 5, wherein if a function exists in which the number of data writes has reached a given number of times, a replacement unit performs control to replace an area of the storage medium which the function uses, with an area of the storage medium used by a specific function using a small number of writes.

8. The image forming apparatus according to claim 1, further comprising:

a presentation unit configured to present a determination result of the determination unit to a user.

9. A control method for an image forming apparatus capable of attaching a storage medium, the control method comprising:

accepting an input of write speed information for a storage medium attached to the image forming apparatus from a user, by an input unit;

determining whether the storage medium can be used in each function which the image forming apparatus has, based on the input write speed information;

presenting a determination result to a user; and matching functionality of the image forming apparatus with write speed capability of the storage medium, wherein the storage medium is a secure digital high capacity card (SDHC-card), and wherein write speed of the storage medium is a speed class of the SDHC-card.

10. A non-transitory computer-readable medium storing a program for causing a computer to execute a method comprising:

accepting an input of write speed information for a storage medium attached to the image forming apparatus from a user, by an input unit;

determining whether the storage medium can be used in each function which the image forming apparatus has, based on the input write speed information;

presenting a determination result to a user; and matching functionality of the image forming apparatus with write speed capability of the storage medium, wherein the storage medium is a secure digital high capacity card (SDHC-card), and wherein write speed of the storage medium is a speed class of the SDHC-card.

11. An image forming apparatus capable of attaching a storage medium, the image forming apparatus comprising:

an input unit configured to input write speed information of a storage medium attached to the image forming apparatus;

a determination unit configured to determine whether the storage medium can be used in each function which the image forming apparatus has, based on the write speed information input by the input unit;

a presentation unit configured to present a determination result of the determination unit to a user; and a storage unit configured to store for each of the functions, a number of data writes indicating a number of times data has been written into the storage medium according to the functions, wherein functionality of the image forming apparatus is matched with write speed capability of the storage medium, and wherein the presentation unit presents a number of data writes for each of the functions stored in the storage unit, to a user.

12. A control method for an image forming apparatus capable of attaching a storage medium, the control method comprising:

accepting an input of write speed information for a storage medium attached to the image forming apparatus from a user, by an input unit;

determining whether the storage medium can be used in each function which the image forming apparatus has, based on the input write speed information;

presenting a determination result to a user;

storing for each of the functions, a number of data writes indicating a number of times data has been written into the storage medium according to the functions;

matching functionality of the image forming apparatus with write speed capability of the storage medium; and presenting a number of data writes for each of the functions stored in the storage unit, to a user.

13. A non-transitory computer-readable medium storing a program for causing a computer to execute a method comprising:

accepting an input of write speed information for a storage medium attached to the image forming apparatus from a user, by an input unit;

determining whether the storage medium can be used in each function which the image forming apparatus has, based on the input write speed information;
presenting a determination result to a user;
storing for each of the functions, a number of data writes indicating a number of times data has been written into the storage medium according to the functions;
matching functionality of the image forming apparatus with write speed capability of the storage medium; and
presenting a number of data writes for each of the functions stored in the storage unit, to a user.

\* \* \* \* \*